(12) United States Patent
Wilson et al.

(10) Patent No.: US 12,359,742 B2
(45) Date of Patent: Jul. 15, 2025

(54) CONTROLLING SHOT PEENING DEVICE VIA MAGNETIC ARRANGEMENT

(71) Applicant: Electronics Inc., Mishawaka, IN (US)

(72) Inventors: Benjamin Wilson, Mishawaka, IN (US); Bryan Chevrie, South Bend, IN (US); Jack Champaigne, Mishawaka, IN (US)

(73) Assignee: Electronics Inc., Mishawaka, IN (US)

( * ) Notice: Subject to any disclaimer, the term of this patent is extended or adjusted under 35 U.S.C. 154(b) by 85 days.

(21) Appl. No.: 18/493,154

(22) Filed: Oct. 24, 2023

(65) Prior Publication Data

US 2024/0133480 A1 Apr. 25, 2024
US 2024/0229964 A9 Jul. 11, 2024

Related U.S. Application Data

(60) Provisional application No. 63/418,789, filed on Oct. 24, 2022.

(51) Int. Cl.
*F16K 31/08* (2006.01)
*B24C 1/10* (2006.01)
*B24C 7/00* (2006.01)
*F16K 31/06* (2006.01)

(52) U.S. Cl.
CPC .............. *F16K 31/082* (2013.01); *B24C 1/10* (2013.01); *B24C 7/0053* (2013.01); *F16K 31/0679* (2013.01)

(58) Field of Classification Search
CPC ..... F16K 31/082; F16K 31/0679; B24C 1/10; B24C 7/0053
See application file for complete search history.

(56) References Cited

U.S. PATENT DOCUMENTS

| | | | | |
|---|---|---|---|---|
| 4,523,146 A | * | 6/1985 | Champaigne | G01N 27/74 324/204 |
| 5,028,902 A | * | 7/1991 | Leupold | H01F 7/0278 315/5.35 |
| 5,654,496 A | * | 8/1997 | Thompson | B24C 5/04 73/1.01 |
| 6,238,268 B1 | | 5/2001 | Wern | |
| 6,931,900 B2 | * | 8/2005 | Taudt | F02M 55/025 451/39 |

(Continued)

FOREIGN PATENT DOCUMENTS

| CN | 209299120 U | 8/2019 |
|---|---|---|
| CN | 215214973 U | 12/2021 |

(Continued)

OTHER PUBLICATIONS

MagnaValve Product Sheet (Year: 1987).*

*Primary Examiner* — Umashankar Venkatesan
(74) *Attorney, Agent, or Firm* — Greenberg Traurig, LLP

(57) ABSTRACT

A valve for regulating the flow of ferromagnetic peening materials, consisting of an arrangement of pole pieces, spacers, permanent magnets, and electrical coils. This arrangement uses an angular magnetic field to concentrate holding strength within the working gaps without sacrificing holding strength to the environment, increasing the valve's efficiency. Additionally, this valve covers a large range of flow rates by exchanging center bars and magnets of different sizes, without otherwise increasing the size of the valve.

13 Claims, 5 Drawing Sheets

(56) References Cited

U.S. PATENT DOCUMENTS

| | | | |
|---|---|---|---|
| 7,264,337 B2* | 9/2007 | Lee | B41J 2/14 |
| | | | 347/55 |
| 7,291,058 B2* | 11/2007 | Champaigne | B24C 5/08 |
| | | | 451/60 |
| 7,511,475 B2* | 3/2009 | Maerky | F16K 37/0033 |
| | | | 123/90.11 |
| 9,181,045 B2 | 11/2015 | Reilley | |
| 9,884,407 B2 | 2/2018 | Ishikawa | |
| 10,471,570 B2* | 11/2019 | Trull, Jr. | B24C 3/06 |
| 10,882,159 B2* | 1/2021 | Cheng | B24C 7/0069 |
| 11,353,135 B1* | 6/2022 | Koenig | F16K 99/0046 |
| 11,768,089 B2* | 9/2023 | Champaigne | G01F 15/005 |
| | | | 73/861 |
| 2014/0373585 A1* | 12/2014 | Ache | C21D 7/06 |
| | | | 72/53 |
| 2020/0400469 A1 | 12/2020 | Champaigne | |

FOREIGN PATENT DOCUMENTS

| | | | | |
|---|---|---|---|---|
| EP | 0964101 B1 | | 3/2004 | |
| GB | 1070867 A | * | 6/1967 | ........... B24C 7/0053 |
| KR | 20170121886 A | | 11/2017 | |

* cited by examiner

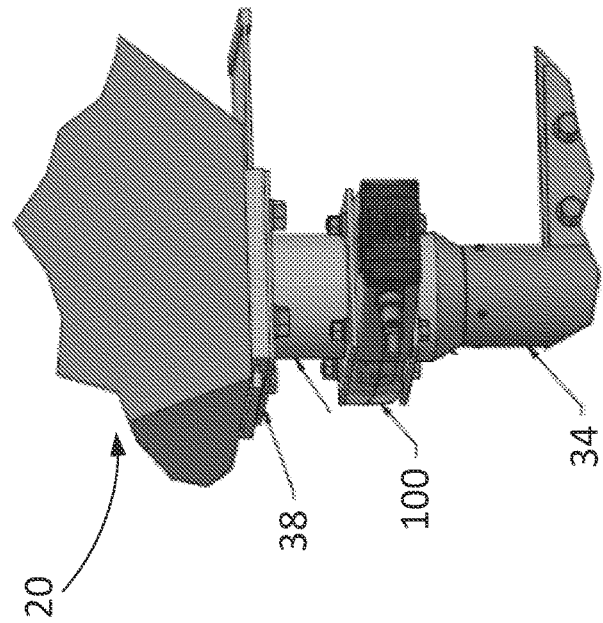
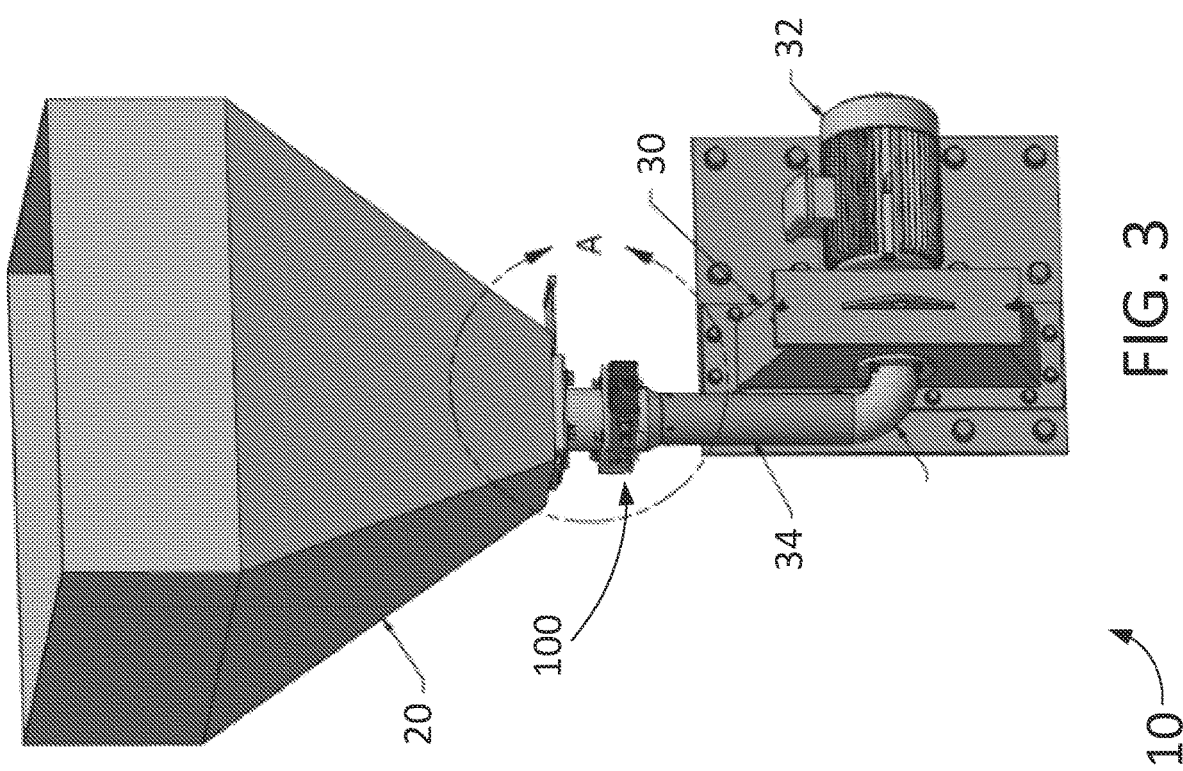

CONTROLLING SHOT PEENING DEVICE VIA MAGNETIC ARRANGEMENT

CROSS REFERENCE TO RELATED APPLICATION

This application is a non-provisional conversion of U.S. Pat. App. No. 63/418,789 entitled "CONTROLLING SHOT PEENING DEVICE VIA MAGNETIC ARRANGEMENT," filed Oct. 24, 2022, the contents of which are incorporated in their entirety and for all purposes.

TECHNICAL FIELD

This disclosure generally relates to shot peening, and, specifically, controlling a shot peening device via a unique magnetic arrangement.

BACKGROUND

Shot peening is a surface enhancement process that imparts a compressive residual stress into the surface of a metal component by impacting metallic, ceramic, or glass peening particles at high velocity.

BRIEF DESCRIPTION OF THE DRAWINGS

FIG. 3 is a perspective view of a shot peening system including the valve of FIG. 1.
FIG. 3A is a detailed view of the valve of FIG. 3.

DETAILED DESCRIPTION

Shot peening is a surface enhancement process that imparts a compressive residual stress into the surface of a metal component by impacting metallic, ceramic, or glass peening media at high velocity. Popular methods for propelling these peening media include air blast systems and wheel blast wheels. In the air blast systems, media are introduced by various methods into the path of high pressure air and accelerated through a nozzle directed at the surface to be peened. In wheel blast style peening applications, shot peening media is fed to the blades of a rotating wheel and propelled toward an impingement target. This media travels through the peening arrangement in very high volumes, in the range of 100-2000 pounds per minute.

In order to regulate this flow, a flow control valve is used. These valves are typically based on magnetism, and are comprised of an arrangement of conductive pole pieces, a center bar, electric coils, spacers, and permanent magnet(s). In an off-state, the magnetic field produced by the permanent magnet(s) and pole pieces provides a force within the "working gap" which is sufficient to prevent the flow of media between the pole pieces and center bar. This force is referred to as "holding strength". In an on-state, the electric coils are charged to a predefined amperage, inducing a counteractive magnetic field to reduce the holding strength of the pole-piece arrangement, permitting a metered rate of media flow.

Existing valves for this purpose suffer from magnetic flux leakage and loss, such that the full holding strength of the magnet is not applied to the media stream. In order to produce a sufficient holding strength within the working gap, it is required to use magnets of very high strength. In order to counteract this excessive magnetism, the coils must be overcharged to induce flow. This is an undesired state, as it is electrically expensive and may reduce the efficacy of the valve. These valves also have limited operating ranges, requiring larger, less convenient valves to be used for higher flow rates.

Figure 1:
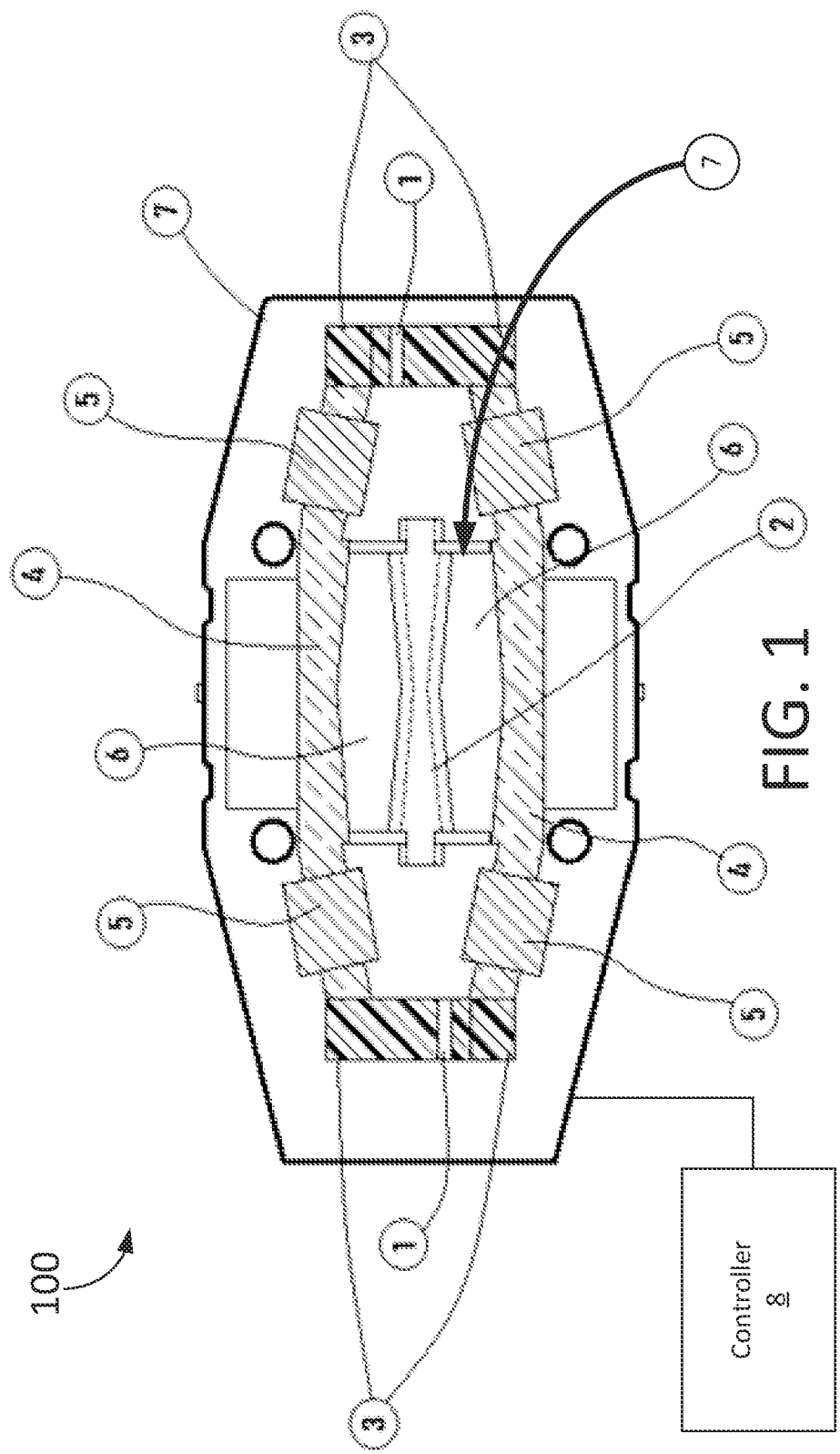
FIG. 1 is a top view of a valve with an upper valve cover omitted.

Referring now to the drawings, wherein like numerals refer to the same or similar features in the various views, FIG. 1 is a top view of an example valve 100 for controlling the flow of shot media. An upper valve section has been omitted to better show the interior of the valve 100. As shown in FIG. 1, the valve 100 includes an opening 7, a pair of magnets 1, a center bar 2, and pole pieces 4. Each magnet 1 is held in place by a pair of magnet spacers 3, which are coupled with (e.g., provide a mated contact with) pole pieces 4. Accordingly, the magnets 1 may be positioned on opposite sides of the opening 7, and the pole pieces 4 may similarly be positioned on opposite sides of the opening 7, such that each of the four components (e.g., two magnets 1 and two pole pieces 4) are located about the edges of the opening 7. For example, the magnets 1 may be positioned on left and right edges of the opening 7 (relative to the view of FIG. 1), and the pole pieces 4 may be positioned on upper and lower edges of the opening 7 (relative to the view of FIG. 1).

These magnet spacers 3 (or shim plates) may mate directly with each of the magnets 1 and the pole pieces 4, such that the magnet spacers 3 are an integral component of the valve 100. The center bar 2 may be fixed in place across the opening 7 but separately from the other metallic components (e.g., magnets 1, pole pieces 4). Collectively, the pole pieces 4 and the center bar 2 form (e.g., define the boundaries of) two working gaps 6 within the opening 7, through which media flow.

Figure 2:
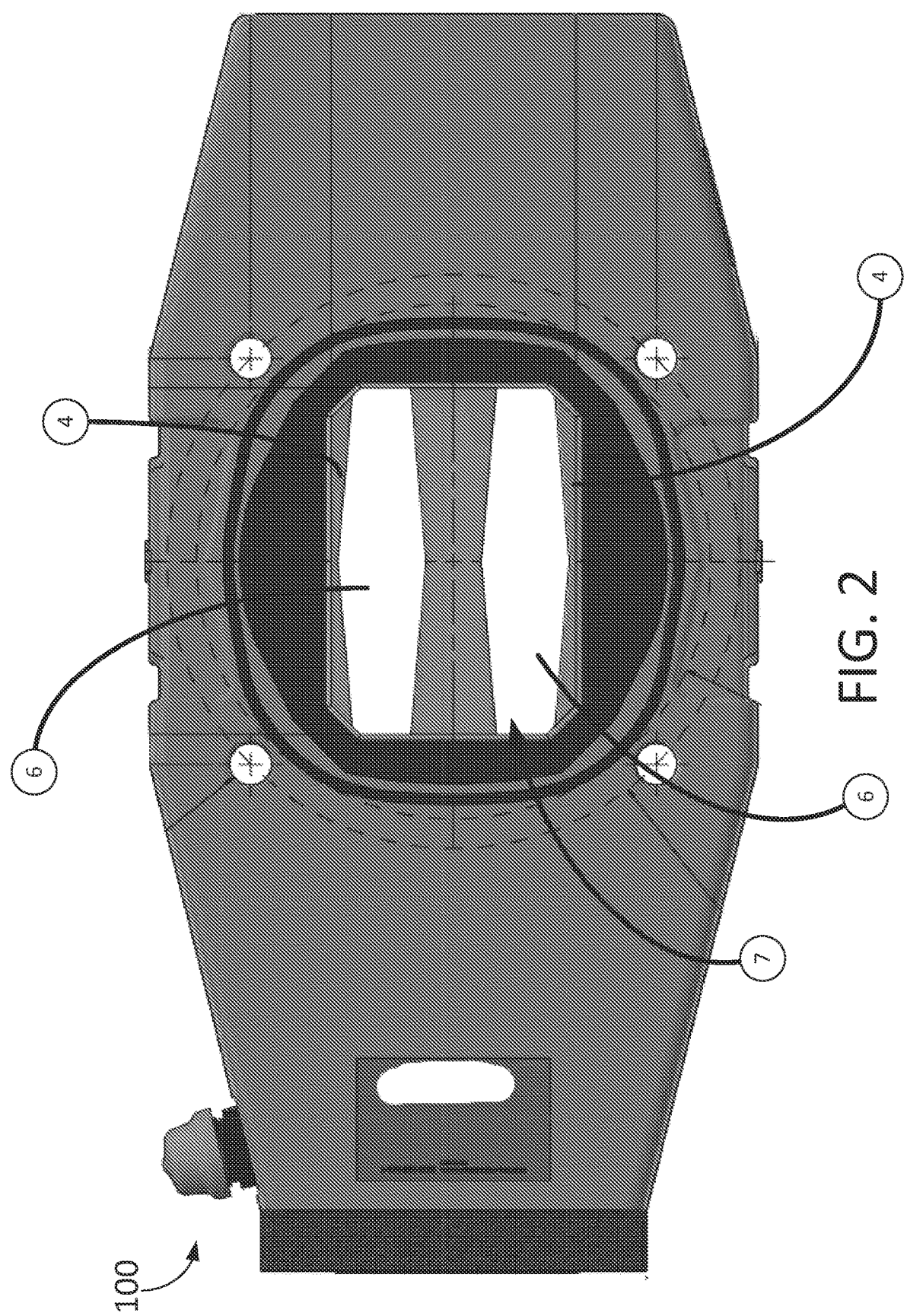
FIG. 2 is a top view of the valve with the upper valve cover included.

Each magnet 1 is positioned on opposite ends of the center bar 2 from the other magnet 1. The magnets 1 may be a rare-earth magnet, and each of the magnets 1 and the center bar 2 may be modified to cover a variety of flow ranges. For example, differently-sized magnets 1 and center bar 2 may be used without otherwise increasing the size of the valve 100. As shown in FIG. 2, the magnet spacers 3 hold the magnets 1 at a non-zero angle (e.g., not the same angle as the center bar 2 itself) relative to the center bar 2, such that one end of the magnet 1 is positioned in a positive-X and positive-Y coordinate relative to a (0,0) coordinate defined by a longitudinal axis of the center bar 2, with the other end of the magnet 1 being positioned in a negative-X and negative-Y coordinate. When the valve 100 is viewed from the side (like the view of FIG. 2), the pair of magnets 1 appear to form an 'X' due to the shared central axis (defined by the center bar 2) and the opposite orientations of each end of the magnet 1.

The magnetic field produced between the pole pieces 4 and the center bar 2 provides a magnetomotive force within the working gap 6 which is sufficient to stop the flow of media through the opening 7 of the valve 100 in its off-state, hereafter referred to as the "holding strength." In particular, the center bar 2 does not create its own magnetic field but instead facilitates the magnetic fields from the pole pieces 4 to enable those magnetic fields to expand across the working gaps. As such, the center bar 2 functions as a "range extender" for the pole pieces, enabling the magnetic fields from the pole pieces 4 to extend across a gap over which the field would not normally extend. In some embodiments, such as those in which the size of the opening is smaller, the center bar 2 may be omitted due to the working gap 6 being small enough for the magnetic field from the pole pieces 4 to extend across. Put differently, the center bar 2 may be omitted in those valves in which an adequate holding strength is maintained across the opening 7 without the boost from the center bar 2. Additionally, as shown in FIG. 1, the magnets 1 are displaced away from the working gap, such that the magnets 1 themselves are not in the flow of media.

In the example shown, the pole pieces 4 are each equipped with a pair of wire coils 5, which provide a cancellation current against the magnetic field produced by the magnets 1. Accordingly, the valve 100 shown here includes four coils, although more (or fewer) coils may be included. When the wire coils 5 are powered (e.g., in an on-state), the overall magnetic field produced from the pole pieces 4 is weakened (and may be substantially zero), such that the holding strength across the working gap 6 is weakened (or disabled) to enable the flow of some (or all) media through the working gap. In some embodiments, a controller 8 is in communication with the valve 100 (and, in particular, the wire coils 5) in order to control a state of the wire coils 5. In a first state, the wire coils 5 are disengaged (e.g., not activated by the controller 8), such that the magnetic field generated by the magnets 1 is unopposed, and the holding strength of the field across the working gaps 6 is at full power. In a second state, the wire coils 5 are engaged (e.g., activated by the controller 8), such that the magnetic field generated by the magnets 1 is opposed by the field generated by the wire coils, and the holding strength of the field across the working gaps 6 is reduced (or outright eliminated). The controller 8 may switch between the first and second states at a regular or pre-determined pattern, such as based on a pulse-width modulation (PWM) rate.

FIG. 3 is a perspective view of an example shot peening system 10 utilizing the valve 100. As shown, the system 10 includes a hopper 20 configured to hold a quantity of shot, a hose 34 configured to direct the shot from the hopper 20 to a wheel 30. The wheel 30, when spun by wheel motor 32, is configured to propel the shot at an intended velocity for desired shot-peening applications. The valve 100, in this example, is positioned between the hopper 20 and the hose 34, and restricts the flow of media from the hopper 20 into the hose 34. In the detailed view of FIG. 3A (defined by arrow A of FIG. 3), the system 10 is shown to further include a slide gate 38 positioned between the hopper 20 and the valve 100. The slide gate 38 is configured to selectively block or expose the valve 100 as a secondary barrier to preventing (or allowing) shot to enter the valve 100 from the hopper 20.

Figure 4:
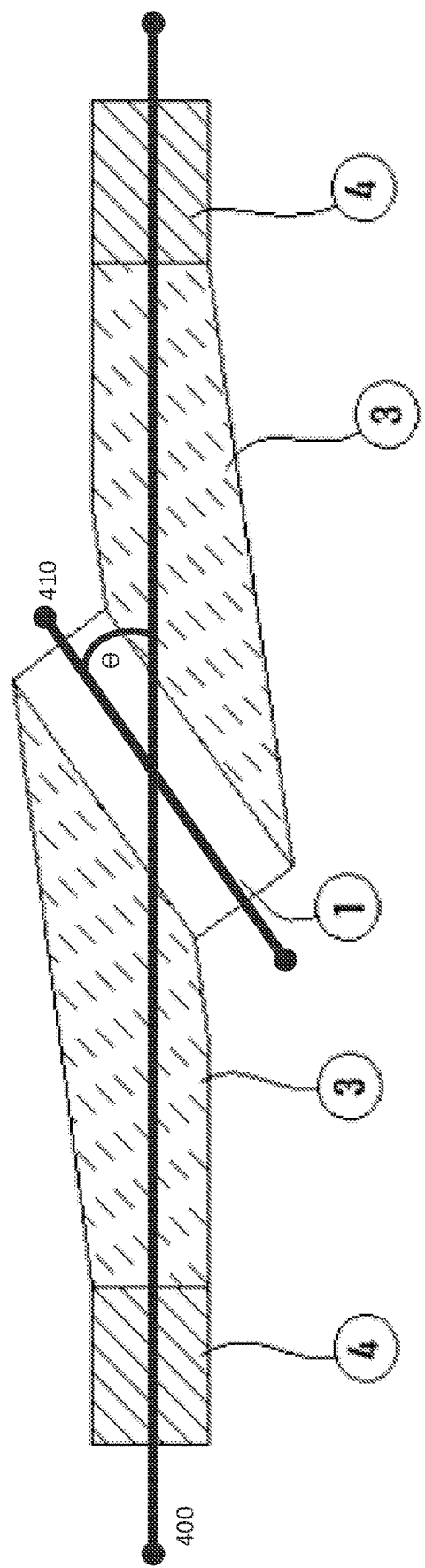
FIG. 4 is a side view of a magnet of the valve of FIG. 1.

FIG. 4 is a side view of the magnet 1 held in place by the magnet spacers 3. As shown in FIG. 4, the magnet 1 is held at an angle relative to the pole pieces 4. As such, the angle is relative to a horizonal plane defined by the mounting position of the valve 100, not necessarily the vertical plane defined by the flow of media. This horizontal plane—which also corresponds to a longitudinal axis defined by a length of the center bar 2—is labeled in FIG. 4 as line 400, with a longitudinal length of the magnet 1 shown as line 410. Accordingly, the angle of the magnet 1 relative to the center bar 2 is shown as the angle θ between lines 400 and 410. This angle θ may be pre-determined based on the shape and size of the spacers 3. In some embodiments, the angle θ is between 30-60°, including 35°, 40°, 45°, 50°, and 55°. Although a particular angular arrangement is shown in FIG. 4, other angular arrangements should be read as within the scope of this disclosure. This angular arrangement concentrates the magnetic field within the working gaps 6, while reducing loss between the spacers 3. Accordingly, the angle θ selected for the magnet 1 is chosen to either maximize (e.g., improve, optimize, make as great as possible, etc.) the effect of the magnetic field within the working gaps 6, or to minimize (e.g., reduce, eliminate, make as small as possible, etc.) an amount of magnetic strength lost (e.g., projected to areas other than the working gaps 6).

Figure 5:
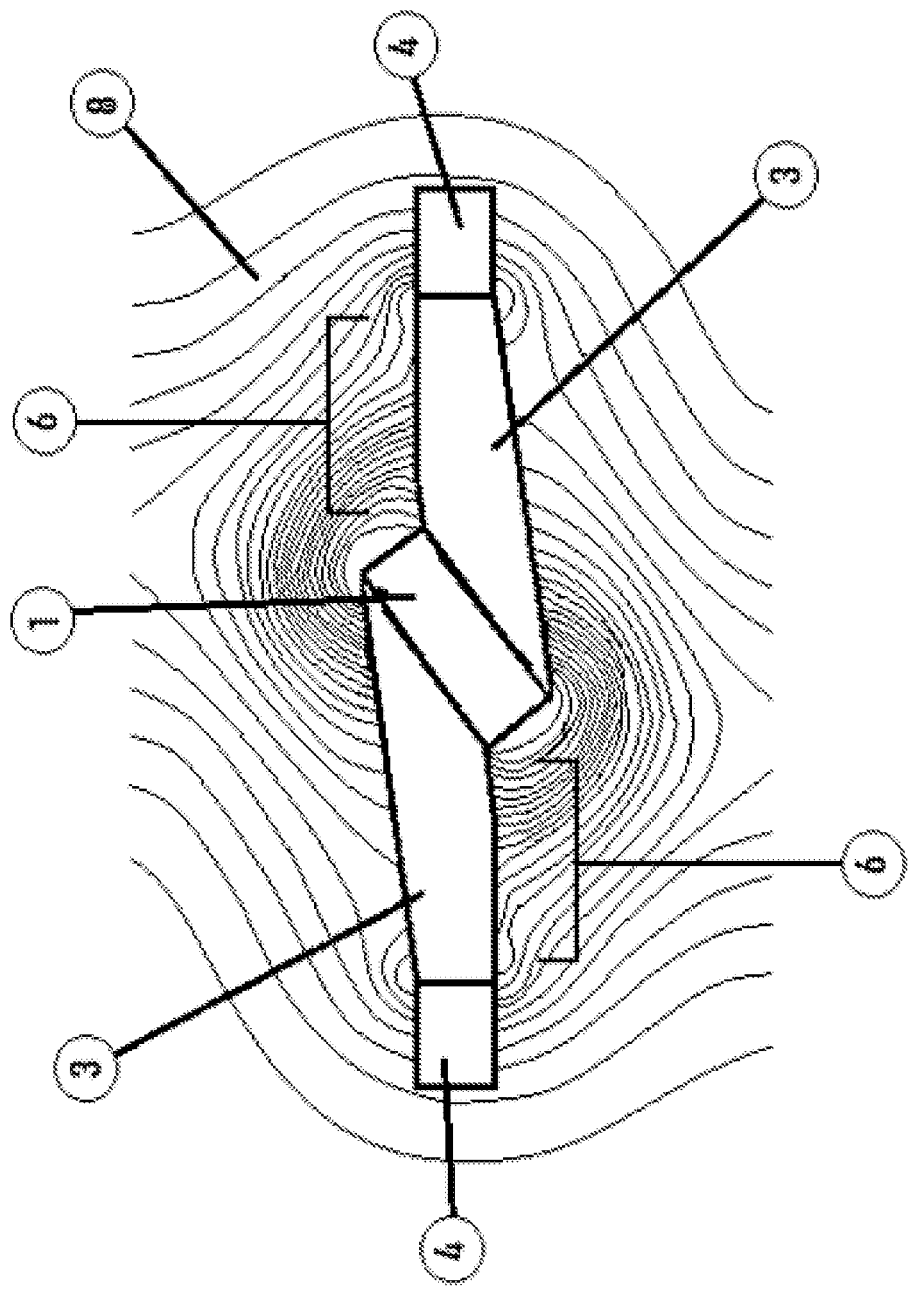
FIG. 5 is a magnetic field plot of the magnet of FIG. 4.

This concentration can be seen in FIG. 5, which is a plot of the magnetic field 8 from the magnet 1. As shown in FIG. 5, the smaller gaps between lines near the magnet 1 are indicative of a higher magnetic field 8 strength. Because the angled arrangement directs the magnetic field 8 to a particular position rather than broadly dispersing, the magnets 1 may be smaller than those traditionally used in prior art, and thus require less power to the wire coils 5 that counteract the magnets 1, increasing the overall efficiency of the valve 100. The arrangement also allows a smaller valve body 7 to be used without sacrificing holding strength, as less magnetic flux is lost to the surrounding space.

While this disclosure has described certain examples, it will be understood that the claims are not intended to be limited to these examples except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

What is claimed:

1. A valve for controlling a flow of media, the valve comprising:
   an opening configured to receive the flow of media, the opening defining a horizontal plane;
   a magnet configured to generate a magnetic field across the opening, the magnet positioned at a non-zero angle relative to the horizontal plane and having a central point along the horizontal plane;
   a coil configured to counter the generated magnetic field; and
   a controller configured to selectively engage the coil.

2. The valve of claim 1, wherein the non-zero angle is between 30-60° relative to the horizontal plane.

3. The valve of claim 1, wherein the magnet comprises a first magnet and a second magnet, the first and second magnets positioned at opposite sides of the opening.

4. The valve of claim 3, wherein the non-zero angle comprises a first angle for the first magnet and a second angle for the second magnet, the first angle different from the second angle.

5. The valve of claim 4, wherein the first angle and the second angle are selected to increase a strength of the generated magnetic field across the opening.

6. The valve of claim 1, wherein the controller selectively engages the coil based on a pulse-width modulation (PWM) signal.

7. A valve for controlling a flow of media, the valve comprising:
   an opening, the opening defining a horizontal plane;
   a first pole piece positioned on an upper edge of the opening, the first pole piece comprising a first coil;

a second pole piece positioned on a lower edge of the opening, the second pole piece comprising a second coil;
a working gap defined by the first pole piece and the second pole piece;
a first magnet coupled to the first and second pole pieces, the first magnet having a center in line with the horizontal plane defined by the opening;
a second magnet coupled to the first and second pole pieces, the second magnet positioned opposite of the first magnet relative to the opening and having a center in line with the horizontal plane defined by the opening;
a first set of spacers configured to position the first magnet at a first rotational angle relative to the horizontal plane;
a second set of spacers configured to position the second magnet at a second rotational angle relative to the horizontal plane, the second rotational angle different from the first rotational angle; and
a controller configured to switch the valve between a first state and a second state,
wherein:
in the first state, the first and second magnets generate a magnetic field across the working gap, and
in the second state, the first and second coils counter the first and second magnets to negate the magnetic field across the working gap.

8. The valve of claim 7, further comprising:
a center bar extending across the opening between the first magnet and the second magnet, the center bar dividing the working gap into a first working gap defined by the center bar and the first pole piece and a second working gap defined by the center bar and the second pole piece, wherein the center bar is configured to increase a strength of the magnetic field across the first and second working gaps.

9. The valve of claim 7, wherein the first rotational angle and the second rotational angle are selected to increase a strength of the generated magnetic field across the working gap.

10. The valve of claim 7, wherein the first rotational angle and the second rotational angle are selected to reduce an amount of the generated magnetic field directed away from the working gap.

11. The valve of claim 7, wherein the valve prevents the flow of media in the first state and enables the flow of media in the second state.

12. The valve of claim 7, wherein the controller is configured to switch the valve in response to a pulse-width modulation (PWM) signal.

13. The valve of claim 7, wherein the first magnet and the second magnet are positioned away from the opening, such that neither the first magnet nor the second magnet are directly exposed to the flow of media.

* * * * *